United States Patent [19]
Crawford et al.

[11] Patent Number: 5,867,240
[45] Date of Patent: *Feb. 2, 1999

[54] LIQUID CRYSTAL CELL CONSTRUCTED TO PRODUCE A HIGHLY ANISOTROPIC LIGHT DISTRIBUTION POSSESSING EXTREMELY HIGH CONTRAST AROUND A NARROW MERIDIAN

[75] Inventors: Gregory P. Crawford, Providence, R.I.; Thomas G. Fiske, Campbell, Calif.; Louis D. Silverstein, Scottsdale, Ariz.

[73] Assignee: Xerox Corporation, Stamford, Conn.

[*] Notice: The term of this patent shall not extend beyond the expiration date of Pat. No. 5,751,390.

[21] Appl. No.: 764,543

[22] Filed: Dec. 12, 1996

[51] Int. Cl.⁶ .......... G02F 1/1335; G02F 1/1333
[52] U.S. Cl. .......... 349/118; 349/119; 349/120; 349/159
[58] Field of Search .......... 349/118, 119, 349/120, 159, 64

[56] References Cited

U.S. PATENT DOCUMENTS

| | | | |
|---|---|---|---|
| 5,175,638 | 12/1992 | Kanemoto et al. | 349/121 |
| 5,179,458 | 1/1993 | Fukui | 349/119 |
| 5,227,903 | 7/1993 | Miyzawa et al. | |
| 5,249,071 | 9/1993 | Yoshimizu et al. | 349/121 |
| 5,440,413 | 8/1995 | Kikuchi et al. | |
| 5,442,467 | 8/1995 | Silverstein et al. | 349/106 |
| 5,528,400 | 6/1996 | Arakawa | 349/117 |
| 5,638,200 | 6/1997 | Xu | 349/117 |

*Primary Examiner*—William L. Sikes
*Assistant Examiner*—Toan Ton

[57] ABSTRACT

A transmissive, backlit color twisted-nematic or super-twisted-nematic liquid crystal display employing a front fiber-optic faceplate or optical equivalent as a front retaining element of a liquid crystal cell that increases viewing angle between the display and a viewer while minimizing or eliminating undesirable variations in luminance, contrast ratio and chromaticity is described. The fiber-optic faceplate or optical equivalent includes cylindrical optical features and interstitial cladding material of greater optical index than the cylindrical optical features. The interstitial cladding material may include an opaque mask blocking layer to prevent the interstitial apertures from diffracting off-axis light into an observer's viewing cone. In particular the liquid crystal display includes dual negative retarders, and a light shaping element such as a brightness enhancing film on the illumination source that increase the effective viewing angle between the display and a viewer while minimizing undesirable variations in display chromaticity, luminance, and contrast ratio. The front fiber-optic faceplate or optical equivalent works in conjunction with the dual negative retarders and the light shaping element to provide an improved contrast ratio with a perfectly symmetric viewing angle and to eliminate grey scale inversions.

5 Claims, 11 Drawing Sheets

LIQUID CRYSTAL CELL CONSTRUCTED TO PRODUCE A HIGHLY ANISOTROPIC LIGHT DISTRIBUTION POSSESSING EXTREMELY HIGH CONTRAST AROUND A NARROW MERIDIAN

BACKGROUND OF THE INVENTION

1. Field of the Invention

This invention generally relates to a transmissive, rear-illuminated twisted-nematic (TN) color liquid crystal display (LCD) employing a special front fiber-optic faceplate or optical equivalent, dual negative retarders, and a light shaping element, such as a brightness enhancing film (BEF), on an illumination source that increase the effective viewing angle between the display and a viewer while minimizing undesirable variations in display chromaticity, luminance, and contrast ratio. In particular, the front fiber-optic faceplate or optical equivalent works in conjunction with the dual negative retarders and the light shaping element to provide an improved contrast ratio with a nearly ideal symmetric viewing cone free from grey scale inversions.

2. Description of Related Art

A conventional, transmissive direct-view color LCD is composed of a source of illumination and a multitude of layered optical elements which each modify the spectral composition of light originating from the source. Moreover, some of these elements, such as polarizers, retardation films and the liquid crystal (LC) layer itself, are optically anisotropic and birefringent layers which produce complex spectral modifications that vary as a function of the material parameters and construction of the LC cell, display voltage (i.e., luminance or gray level), and the direction of light propagation. The predominant LC cell configuration for high-performance color LCDs is the twisted nematic(TN) cell. In the TN cell, incoming light is initially linearly polarized by an entrance polarizer and then the axis of polarization is optically rotated by the LC layer. The rotation of the axis of polarization is mediated by the birefringence and thickness of the LC layer. The typical twist or rotation angle used for most TN LCDs is 90°, although other twist angles may be used to achieve certain desired optical characteristics. After optical rotation by the LC layer, the polarization state of light exiting the LC layer is analyzed by the exit polarizer or "analyzer." Two principle configurations of TN cell entrance and exit polarizers are used, LCDs that utilize crossed polarizers are often called normally-white (NW) mode LCDs while those consisting of parallel polarizers are typically called normally-black (NB) mode LCDs. For both voltage-controlled gray scale and off-axis viewing, the light path through the LC layer encounters a different optical birefringence than in the fully voltage-saturated, on-axis situation. This is due to the fact that the angles at which the light path intercepts the anisotropic LC molecules vary as a function of both LC cell voltage and viewing angle. This in turn results in different degrees of stimulation of the ordinary and extraordinary modes of the LC causing varying degrees of phase difference between the two polarization components, different polarization states at exit from the LC cell, and resulting variations in light transmission through the exit polarizer. In addition, phase differences between polarization components and resulting variations in light transmission are wavelength dependent, thereby resulting in chromaticity differences as well as intensity or luminance differences. Off-axis viewing adds additional complications due to path length differences through all of the material layers comprising the LCD as well as angle-related reflection and polarization effects at all of the different optical boundaries.

As such, LCDs, and in particular TN color LCDs, exhibit undesirable variations in luminance, contrast ratio and chromaticity as a function of the viewing angle between the display and an observer. Moreover, since both off-axis viewing and voltage-controlled gray scale result in variations in display luminance, contrast ratio and chromaticity, the combination of these two factors further accentuates the viewing cone anisotropies evident in direct-view TN LCDs. In some instances, i.e., at particular combinations of viewing-angle and voltage-controlled gray level, the contrast ratio of the display may actually reverse and the desired color may shift to a complementary hue. Obviously, these anisotropies in display visual characteristics greatly limit the useful angular viewing cone of the display, especially for direct-view TN color LCDs employing voltage-modulated gray level control. Thus, while this LCD configuration has many desirable operating characteristics and is therefore commonplace for high-performance direct-view color LCDs (often employing an active-matrix addressing substrate to facilitate high-resolution/high-contrast operation), viewing angle limitations severely compromise the ultimate imaging performance achievable with this display device.

A number of potential solutions to ameliorate viewing angle problems in direct-view LCDs have been proposed; including the use of a diffusing optical layer at the output of the LCD, three-dimensional retardation films or optical compensators [e.g., Ong, H. L. (1993). Negative-Birefringence Film-Compensated Multi-Domain TNLCDs with Improved Symmetrical Optical Performance. *SID Digest of Technical Papers*, 658–661], and so-called multi-domain pixel structures [Tanuma, S. (1988). Japan Patent No. 63-106624; Otani, A. (1989). Japan Patent No. 0188520]. The use of a diffusing optical layer (e.g., ground-glass scattering screen) at the output of the LCD would result in a de-coupling of the LCD from the viewing direction; however, such a diffusing element would scatter light from both directions and would severely degrade LCD image contrast under incident ambient illumination, which is typical for most office and outdoor environments.

Retardation films or optical compensators can produce some limited but useful improvements in LCD viewing angle; however, the phase retardation imparted to the light propagating through the film is highly wavelength sensitive and can thus only compensate for a limited portion of the visible spectrum. Moreover, retardation films can not eliminate LCD grey scale inversion problems. These shortcomings limit the effectiveness of retardation films or optical compensators when used for improving the viewing angle of full-color displays; however, they are a simple and cost effective means of achieving some viewing angle performance improvement.

Retardation films have been discussed in U.S. Pat. No. 5,227,903 to Miazawa et al. titled "Liquid Crystal Display Device with at Least One Biaxial Retardation Film Having $N_x > N_z > N_y$", U.S. Pat. No. 5,440,413 to Kikuchi et al. titled "Liquid Crystal Display Device with 2 Adjacent Biaxial Retardation Plates Having $N_y < N_z < N_x$" and U.S. Pat. No. 5,528,400 to Arakawa titled "Liquid Crystal Display Device Having Negative Uniaxial Anisotropic Film with Inclined Optical Axis and Protective Films".

Arakawa discloses a liquid crystal device composed of a TN liquid crystal cell with a pair of polarizing plates arranged on both sides of the cell. Each plate comprises a polarizer and a pair of protective films, one on each side of the polarizer. Additionally, there are optical compensation sheets between the cell and the polarizing plates. The optical compensation sheets may be located either on one or both sides of the TN liquid crystal cell. The properties of the optical compensation sheets are such that they must be grouped in pairs such that one sheet has an optic axis in the direction of the normal of the film while the other sheet has an optic axis in a direction that is inclined from 5 to 50 degrees from the normal to the film. Both films have an optically negative uniaxial property. The films may be arranged such that light passes through either one of them first. Further the sum of the Re values of the films having an optic axis in a direction of the normal with the Re values of the protective coatings between the polarizers must be in the range of 100 to 400 nm where Re is defined as $\{(nx+ny)/2-nz\}xd$. This liquid crystal display device shows improvement in viewing angle and grey scale inversion.

Kikuchi et al discloses a TN liquid crystal cell with a polarizer and analyzer arranged respectively on the incident and exit sides of the cell with at least one biaxial retardation plate arranged between the polarizer and the analyzer. The biaxial retardation plate must have its indices of refraction in the x, y, and z directions described by $ny<nz<nx$ and the product of its refractive index anisotropy with its thickness ($\Delta nd$) must fall within the range of 300 to 400 nm. In this device grey scale inversion is improved and changes in color along the horizontal axis are improved.

Miyazawa discloses a super-twisted nematic (STN) liquid crystal cell with a polarizer and analyzer arranged respectively on the incident and exit sides of the cell and two biaxial retardation plates arranged between a substrate of the TN liquid crystal cell and the analyzer. The biaxial retardation plate nearest the TN liquid crystal cell is arranged such that its phase delay axis is inclined at approximately 40 degrees with respect to the incident-side aligning treatment direction. The biaxial retardation plate nearest the analyzer is arranged such that its phase delay axis is inclined at approximately 5 degrees with respect to the incident-side aligning treatment direction. Both biaxial retardation plates have refractive indices nx, ny, and nz described by the equation $ny<nz\leq ny+0.3(nx-ny)$. An alternative embodiment has two retardation plates arranged to sandwich the pair of substrates in the TN liquid crystal. When the retardation plates are arranged in this configuration each retardation plate will have refractive indices nx, ny, and nz described by the equation $ny+0.3(nx-ny)\leq nz\leq ny+0.7(nx-ny)$. The product of the refractive index anisotropy of the STN liquid crystal material and the thickness of the STN liquid crystal layer preferably falls within the range of 800 to 910 nm, while the phase retardation of the biaxial retardation plates ranges from 340 to 450 nm.

Finally, relatively recent developments in multi-domain pixel structures, which are optically self-compensating alignments within the LC cell, can prove to be highly effective at improving the viewing angle of direct-view color LCDs. Multi-domain alignment can provide a symmetric viewing angle and eliminate grey scale inversions if one pixel is divided into four domains; however, the processing required to achieve four separate domains is extensive. In addition, such multi-domain alignments can be difficult to establish precisely and also significantly complicate the manufacture of the LC cell leading to substantially increased costs. A two-domain alignment method is less costly and complicated to manufacture and can improve either the horizontal or vertical viewing angle, depending on the orientation of the domains but can not eliminate grey scale inversions. In addition, there is a tendency for the domain or alignment boundaries to appear as visible borders, patterns and striations in the display, thereby degrading the image quality of the LCD. The inherent manufacturing and cost problems have prevented the wide implementation of multi-domain alignment into liquid crystal display products.

Typical color LCD displays use a patterned, mosaic of color selection filters created within the LC cell itself and registered with the two-dimensional pixel matrix. In addition, a subtractive or stacked color LCD configuration can be created with three sequentially ordered and spectrally-selective LC cells which each subtract or remove an orthogonal component of the visible spectrum. Examples of different configurations of subtractive or stacked color LCDs can be found in U.S. Pat. No. 5,032,007 to Silverstein et. al., U.S. Pat. No. 4,917,465 to Conner et. al., and U.S. Pat. No. 4,416,514 to Plummer. While successful as a full-color LCD light valve for projection displays in which the light rays passing through the stack of subtractive cells are collimated or at least telecentric, the subtractive or stacked LCD arrangement is not desirable for use with a backlit, direct-view LCD due to viewing-angle problems arising from the parallax produced by the relatively thick stack of spectrally-selective cells. For these reasons, spatial-additive color synthesis via a planar mosaic of color selection filters is the preferred approach to achieving full color in direct-view LCDs. Examples of mosaic color filters are shown in U.S. Reissue No. 33,882 to Morozumi, U.S. Pat. No. 4,987,043 to Roosen et al. and U.S. Pat. No. 5,066,512 to Goldowsky et al.

Conventional processing or creation of the patterned mosaic of color selection filters within the LC cell is costly, inefficient and severely limited by material compatibilities with the LC fluid. These filters are placed within the LC cell, which typically has a cell gap width on the order of 3 to 7 microns, in order to reduce viewing parallax in displays with small pixel dimensions. Placing the color selection filters outside of the LC cell would require that the filters be displaced from the pixel-forming apertures within the LC cell a minimum distance equal to the thickness of the LC cell glass, which is typically on the order of approximately 1100 microns. This would result in very significant viewing parallax between a pixel aperture and the associated color selection filter, such that at off-axis viewing angles light rays from an addressed pixel could easily go through the incorrect color selection filter (e.g., light rays from an addressed RED pixel aperture actually going through a GREEN color selection filter).

As such, there exists a need for improved color filter processing and placement; allowing easier processing, the use of more efficient filter materials, and increased color image quality over a larger viewing angle range. If an optical means could be developed to control or constrain the angles at which light propagated through the layers of a direct-view LCD until the final optical interface where the light rays may be expanded to provide a wide viewing angle (thereby effectively decoupling the LCD from the viewing orientation), then absorptive color selection filters could be placed outside the LC cell or highly-efficient, interference-type color selection filters could be employed. In either case, this would enable the color filters to be located on a different optical layer than the LC cell, processed using a wider range of more efficient color filter materials and processing stages, and should result in improved manufacturing yields, reduced production costs, and significantly improved LCD color performance and luminous efficiency.

Fiber-optic faceplates (FOFPs) have been used for contrast enhancement on special-purpose Cathode Ray Tube (CRT) displays, as light-collection elements on the front surface of reflective monochromatic LCDs to enhance the reflected luminance of the display, as light channeling elements for coupling patterned color phosphor mosaics to their respective pixel apertures in rear-illuminated color LCDs, and as image relay elements for coupling the output of image generation devices to photo-recording surfaces for hardcopy applications. Several patents relate to FOFPs. These include U.S. Pat. No. 4,344,668 to Gunther et al.; U.S. Pat. No. 4,349,817 to Hoffman et al.; U.S. Pat. No. 4,558,255 to Genovese et al.; U.S. Pat. No. 4,752,806 to Haas et. al.; U.S. Pat. No. 4,799,050 to Prince et al.; U.S. Pat. Nos. 5,035,490 and 5,181,130, both to Hubby, Jr; U.S. Pat. No. 5,050,965 to Conner et al.; U.S. Pat. No. 5,053,765 to Sonehara et al.; U.S. Pat. No. 5,113,285 to Franklin et al.; and U.S. Pat. No. 5,131,065 to Briggs et al.

Haas et. al. uses a FOFP to channel light emerging from an LC layer to a lens array and then to a photoreceptor. Genovese et. al. use a FOFP to channel light emitted by a vacuum fluorescent device to expose a photosensitive member for a printing device. These applications do not relate to direct-view display devices.

Briggs et. al. uses a front FOFP to channel light emerging from an emissive phosphor layer to a viewer in order to create a high luminance and high contrast thin-film electroluminescent display. Prince et. al. employ a FOFP as a light channeling element for coupling the emissions of a patterned color phosphor mosaic excited by an ultra-violet source to their respective pixel apertures in a rear-illuminated color LCD. These patents relate to the channeling of phosphor emissions in direct-view display devices and are not directly concerned with the improvement of off-axis viewing.

Hubby, Gunther et. al. and Hoffman et. al. all relate to reflective LCD devices that use a FOFP to collect incident light from a wider acceptance angle for the purposes of enhancing the reflected luminance and contrast of the display. This approach does not address the generation of color in an LCD and, in fact, is not applicable to a color LCD because there is not sufficient reflected luminance in such a LCD device to enable color separation and filtering and still provide enough output luminance for comfortable viewing. Moreover, this approach is not concerned with enhancing off-axis viewing performance.

Conner et. al. relates to a STN LCD that requires a collimated light source and uses sequentially-stacked subtractive color LC cells. The primary approach is intended for projection display applications. When applied to the direct-view situation, the display output requires decollimation or diffusion. This results in degraded image contrast and color desaturation under ambient illumination. This approach does not directly address high-performance, direct-view, transmissive TN color LCDs.

None of these references appreciate the problems overcome by the present invention.

U.S. Pat. No. 5,442,467, filed on Mar. 21, 1994 by Silverstein et al., the subject matter of which is incorporated herein by reference, discloses a direct-view rear-illuminated LCD device, comprising: a backlight source; a rear diffuser layer; a rear polarizer; a LC cell including a rear glass layer with addressing elements and indium tin oxide (ITO) transparent pixel electrodes, a LC layer having a top and bottom surface, and a front FOFP as a front containing element of the LC cell and being located directly in contact with the top surface of the liquid crystal layer; a mosaic array of color absorption filters either deposited on the front face of the FOFP or located on a separate but adjacent substrate; and a front polarizer or analyzer. The front FOFP provides for a relatively narrow light acceptance solid angle ($\theta_{Max}$IN) at a rear face adjacent the LC layer and a relatively wide light exit or output solid angle ($\theta_{Max}$OUT) at a front face opposite the rear face.

For purposes of the present invention, it should be understood that the term fiber-optic faceplate or FOFP is interpreted in its broadest sense as any material which embodies the essential optical properties of a FOFP. Thus, the functioning of the present invention is not dependent upon the use of a fused plate of optical fibers but rather on any material layer, including a fused plate of optical fibers, which is capable of total internal reflection, controllable NA at input and output surfaces, rotational azimuthal averaging and translation of the object plane from the back surface of the layer to the front surface of the layer. It should be apparent to those skilled in the art that these essential optical properties could be imparted to a range of materials, thus producing FOFP optical equivalents. These could include micro-machined or preformed glass or plastic substrates with a plurality of optical features, a variety of polymer networks containing a duality of materials with differing refractive indices or birefringence produced by physical alignment or stress, or any other approach able to result in a substrate containing a plurality of cylindrical features whose boundaries are defined by a discontinuity of refractive indices wherein the index of refraction within the cylindrical features is greater than the index of refraction at the boundaries and external to the cylindrical features.

DETAILED DESCRIPTION OF PREFERRED EMBODIMENTS

Figure 1:
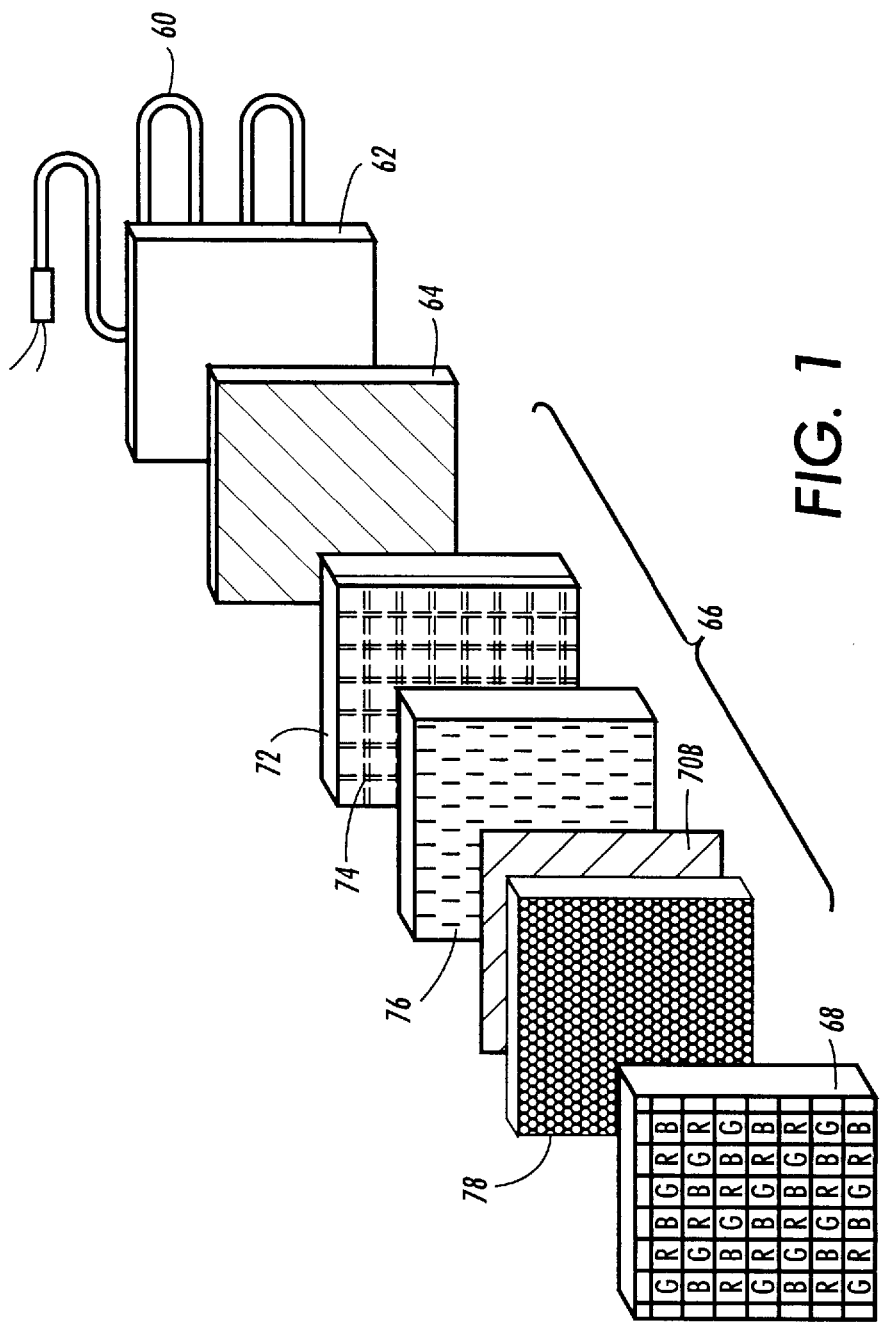
FIG. 1 shows an exploded view of a direct-view, transmissive, backlit color LCD display having a front FOFP.

FIG. 1 corresponds to an embodiment described in U.S. Pat. No. 5,442,467, the subject matter of which is incorporated herein by reference. These embodiments will be described in greater detail to ensure a complete understanding of the present invention. FIG. 1 shows a direct-view, backlit transmissive color LCD display including a backlight source 60, preferably a tri-band hot- or cold-cathode fluorescent lamp with light collection and distribution optics, a diffuser 62, a rear linear polarizer 64, a LC cell 66, a mosaic array of color selection filters 68, and a front linear polarizer or analyzer 70b. The LC cell 66 includes a rear glass layer 72 having matrix addressing elements 74 and ITO pixel electrodes, a LC layer 76, preferably containing a TN configuration, and a front retaining element 78. Front retaining element 78, which typically has been a front glass layer, and is a FOFP according to this invention.

Alignment polyimide are deposited on the rear surface of FOFP faceplate 78. A common ITO electrode is formed on the front polarizer 70b between the polarizer 70b and the LC layer 76. FOFP faceplate 78 and front polarizer 70b are used in conjunction with rear cover glass layer 72 and associated matrix addressing elements 74 to contain LC layer 76. FOFP 78 is made up of a plurality of individual optical fibers, which are fused with appropriate cladding material and then cut and polished to the desired thickness. FOFP 78 is in direct contact with the front front polarizer 70b and relays the light rays propagating first through the LC layer 76, then through front polarizer 70b forward to another image plane at the exit or front surface of FOFP 78.

Normally, because of the optical properties of the LC material and polarizers as well as optical path length effects through all materials comprising the LCD, off-axis viewing results in substantially varying image contrast, chromaticity and other characteristics. However, FOFP 78 transmits via total internal reflection, through the FOFP fibers, the light passing through the liquid crystal layer for rays within a restricted solid angle determined by the numerical aperture of the FOFP 78 and the refractive indices of the materials bounding the FOFP 78. This prevents a viewer from seeing directly into the LCD from any viewing orientation because the FOFP 78 decouples the LC layer 76 and other optical elements behind it from the light rays exiting the front surface of the FOFP 78. In addition, the rotational azimuthal averaging property of the FOFP eliminates directional anisotropies and provides a uniform image at all azimuthal positions. Thus, the image relayed by the FOFP 78 as viewed by an observer over a relatively large range of off-axis angles is much improved compared to that created by a directly viewed LCD (without the FOFP). The result is that enhanced contrast and color performance, as well as greater homogeneity in the appearance of the display, can be obtained over a wider range of viewing angles.

The FOFP 78 has a rear (input) face, adjacent to front polarizer 70b which is adjacent to LC layer 76, with a specific numerical aperture. For example, with a numerical aperture of 0.80 and a LC refractive index of approximately 1.6, $\theta_{max}\text{IN}=\arcsin[(1/1.6)\,0.8]=30°$, thereby restricting the light transmitted by the FOFP to a relatively narrow solid angle of 30°. Light rays outside of the solid angle $\theta_{Max}\text{IN}=30°$ will leak out of the fibers or optionally be absorbed via extramural absorption (EMA) in the cladding material of the FOFP 78. Since only a relatively narrow cone of light rays propagating through the LC layer are transmitted by the FOFP 78, only rays at angles that result in a relatively high contrast and good color performance are transmitted to the output face of the FOFP 78. At the output face of the FOFP 78, a relatively high refractive index of approximately the same value of the LC material occurs at the output boundary of the FOFP 78 as well as in subsequent optical layers of the LCD. Thus, $\theta_{Max}\text{OUT}=\theta_{Max}\text{IN}=30°$. Assuming that all optical layers on the output side of the FOFP 78 are of materials with a refractive index of about 1.6 (e.g., linear polarizer and color absorption filters) and that these layers are bonded together with an index matching adhesive material, then light will propagate through these subsequent layers at approximately the same angles as those at output from the FOFP with a $\theta_{Max}\text{OUT}=30°$. At the final optical interface of the LCD with air, the solid angle of light rays exiting the LCD will expand according to the angle of refraction produced at the final optical interface of the LCI), $\theta_{ref}=\arcsin[(1.6/1.0)\sin 30°]=53.13°$. Thus, $\theta_{Max}\text{OUT}$ for the entire LCD, or the effective viewing angle of the direct-view LCD according to this embodiment, is equal to 53.13°. A restricted solid angle of light rays propagating through the LC layer and other previous optical layers and yielding the good contrast and color performance of this restricted solid angle is expanded at the final optical interface of the LCD. This, combined with the azimuthal averaging property of the FOFP, yield good contrast and color performance over a much larger solid angle at output.

In order for the image to appear maximally sharp and focused and to prevent optical crosstalk between adjacent pixels (that would also result in degradation of color performance when a spatial mosaic of color filters is utilized for color selection in a color LCD), the input face of the FOFP 78 should be in close proximity to the pixel-forming plane of the display. That is, the distance between the input face of the FOFP 78 and the pixel-forming plane of the LCD should be small compared with the size of a display pixel. Since the pixel-forming plane of the LCD is the LC layer 76 and typical pixel sizes are in the range of 100 to 400 microns, the input face of FOFP 78 is in very close proximity to the LC layer 76, separated only by the ITO, LC alignment layers, and front polarizer 70b.

Fiber-optic faceplates of various sizes and numerical apertures, including those constructed with polarization-maintaining optical fibers, can be obtained through Incom Inc.—Fiber Optic Div., of Southbridge, Mass.; Galileo Electro-Optics Corp., of Sturbridge, Mass.; and Schott Fiber Optics, Inc., of Southbridge, Mass. In addition, specialty optical fibers with various optical characteristics and polarization preserving properties are available from 3M Specialty Optical Fibers of West Haven, Conn.

According to one embodiment, the display is a high quality, direct-view color LCD and includes a mosaic color filter array 68 consisting of a plurality of red, green and blue filter elements, each corresponding to a pixel of the display. The number of filter elements in the array depends on the resolution and the size of the display.

Preferably, mosaic color filter array 68 is composed of a mosaic of color absorption filters which enable relatively homogeneous color selection over a broad range of viewing angles. A spectral absorption filter works by taking the input from a relatively broad-band source of illumination and absorbing, via suspended dyes or pigments, selected portions of the broad-band spectrum. Thus, the absorption filter transmits those portions of the input spectrum that are not absorbed by the dyes or pigments. If, for example, the filter was a red filter, it would transmit light within the long-wavelength or red region of the visible spectrum while absorbing other portions of the spectrum such as the green and blue regions. Standard color absorption filters constructed using glass or plastic binding materials are well known in the art and are available from a wide range of manufacturers.

As previously described, there are problems associated with locating filter 68 within the LC cell itself. Standard glass or plastic filters cannot be used to create the filter mosaic and specialized thin-film color absorption filter materials must be used and deposited directly in stages (for each color) on the internal surface of the LC cell substrate or containing element, for example the internal surface of either the front or rear cell glass of a typical color LCD. Such processing or coating is typically accomplished using spin coating, which severely limits the materials that can be chosen for the filter. Additionally, the filter has to be processed when forming the cell and the filter materials must be compatible with the LC material or an additional passivation layer formed by another processing step. Color absorption filter materials for use in constructing thin-film color filter mosaics are available from a number of sources, including Brewer Sciences, Inc. of Rollo, Missouri, as well as Nitto Denko and Toppan both of Japan.

Additionally, there are problems with placing a color filter mosaic outside of the cell in a typical color LCD, such as a direct-view color TN LCD. The gap between the color filter and the LC layer results in parallax when viewed off-axis, resulting in incorrect registration between display pixels and their respective color filters. As such, a typical, high-resolution color LCD demands placement of the color filter mosaic within the LC cell.

However, because this embodiment utilizes a FOFP as a front retaining element for the LC cell, the pixel-forming plane of the LC layer is relayed or guided to the output face of the FOFP 78. Accordingly, color filter mosaic 68 composed of thin-film color absorption materials can be deposited directly to the front or output face of FOFP 78 or, alternatively, a separate substrate containing a mosaic of color absorption filters can be bonded directly to the front (output) face of FOFP, with little or no misregistration due to angular parallax between LCD pixels and their respective color filters.

The ability to locate the mosaic of color filters outside of the LC cell allows a much greater variety of filter materials to be selected, such as glasses, plastics, gelatins or other filter materials. This can result in improved LCD color performance since more spectrally selective filters materials can be utilized and can also reduce processing costs because the filter can be processed separately from the LC cell.

Front polarizer or analyzer 70b is a linear sheet polarizer of substantially the same construction and characteristics as rear polarizer 64. Front polarizer or analyzer 70b is located within the LC cell 66 adjacent to the input face of the FOFP 78. The common ITO electrode is formed on the polarizer between the polarizer and the LC layer. Suitable sheet polarizers of various thicknesses and extinction ratios can be obtained from a range of suppliers including Nitto and Sanritzu, both of Japan and Polaroid Corp., of Norwood, Mass.

This configuration enables analysis of the polarization state of light exiting the LC layer 76 prior to entering the FOFP 78, thereby avoiding any potential degradations in LCD contrast resulting from depolarization in the optical fibers of the front FOFP. However, since the pixel-forming plane is within the LC layer 76, the thickness of the internal front polarizer or analyzer 70b should be relatively small compared to the size of the LCD pixels. Since LCD pixel sizes will in general range from approximately 100 to 400 microns, typical high-efficiency sheet polarizers that range in thickness from about 150 to 250 microns for front integral polarizer 70b will result in some loss of image sharpness and optical crosstalk between adjacent pixels. According to the teachings of U.S. Pat. No. 5,181,130 to Hubby and U.S. Pat. Nos. 2,400,877; 2,481,380; and 2,544,659 to Dreyer, internal front polarizer 70b can be formed by a thin layer of aligned organic dyes to maximize the ratio of pixel size to polarization layer thickness. Polarization layers formed by such processes can be within the range of 0.5 to 50 microns. In addition, thin polarizer coatings can be obtained from Sterling Optics of Williamstown, Kentucky, and thin film K-type polarizers can be obtained from Polaroid, Inc. of Cambridge, Mass.

Figure 2:
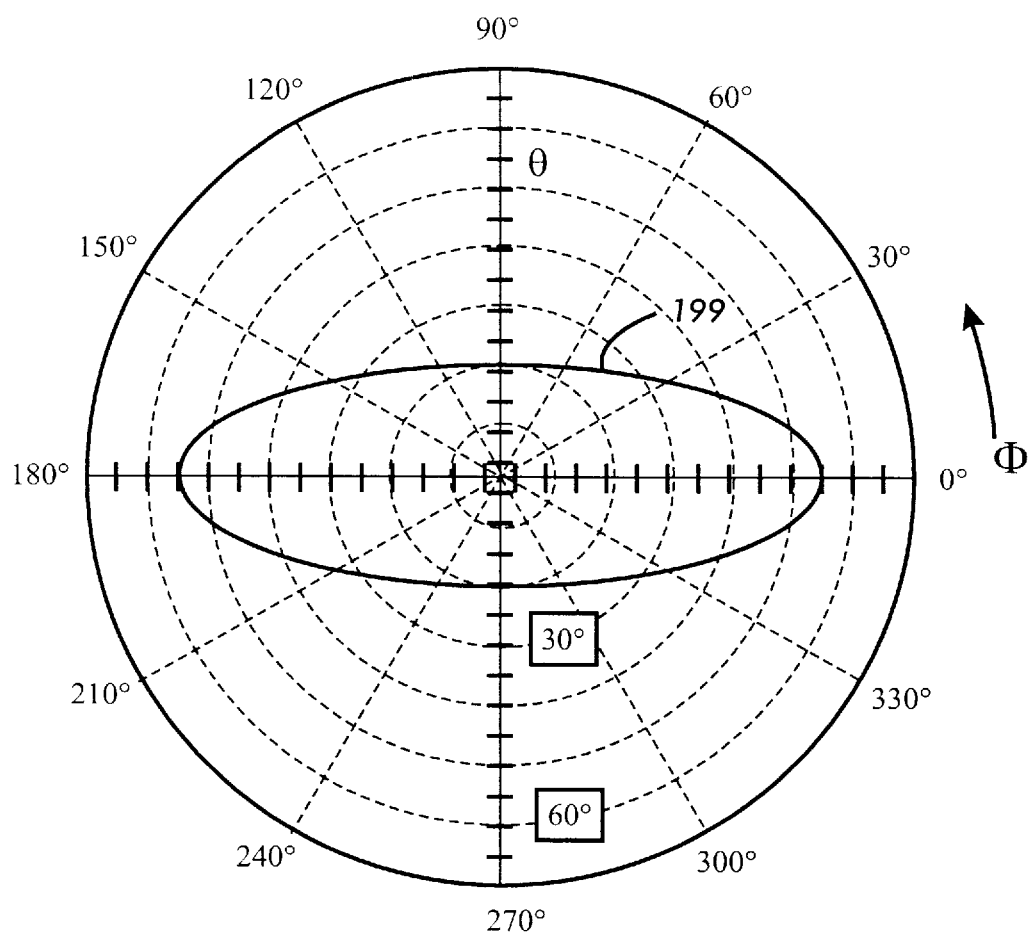
FIG. 2 is an example of an iso-contrast diagram for a liquid crystal cell with a narrow viewing angle along one meridian, but with a wide viewing angle and uniformly high contrast in the orthogonal direction.

The FOFP passive optical element is used as the last optical element in the liquid crystal display system to greatly improve the viewing angle characteristics of the liquid crystal display. The viewing angle characteristics are typically presented on polar diagrams, known as iso-contrast diagrams, in which curves of equal contrast ratio are plotted. An example of an iso-contrast diagram is shown in FIG. 2. Implementing the FOFP into the stack of optical elements that comprise the liquid crystal display system results in improved viewing angle performance as illustrated by an azimuthally symmetric iso-contrast diagram (concentric circles centered on the origin). The azimuthal averaging effect of the FOFP corrects the poor viewing angle performance of the conventional liquid crystal display. See, for example, Terry Scheffer and Jurgen Nehring, "Twisted Nematic and Supertwisted Nematic Mode LCDs," in Liquid Crystals: Applications and Uses, edited by B. Bahadur, World Scientific, Singapore, 1990, the subject matter of which is incorporated herein by reference.

As discussed in previous sections, the FOFP embodies the property of azimuthal averaging which provides symmetric viewing angle performance at any given declination angle ($\theta$) from the normal to the display surface. However, the FOFP can not correct or compensate for liquid crystal cell contrast or viewing angle variations across declination angles. By engineering a liquid crystal display cell that has a very narrow, high-contrast viewing angle along one meridian or narrow azimuthal position, the FOFP element will distribute this region of high contrast to all azimuthal positions by virtue of its azimuthal averaging property. FIG. 2 shows the iso-contrast pattern 199 of such a liquid crystal display cell which has a high-contrast ratio predominantly along one meridian or azimuthal position. While such a liquid crystal display cell would have limited application as a stand alone display, when such a cell is coupled with an FOFP and light shaping elements, the FOFP transforms the viewing angle characteristics of this cell to be perfectly azimuthally symmetric with a high contrast ratio across many declination angles(i.e., a single circle or tightly grouped concentric circles centered on the origin).

Figure 3:
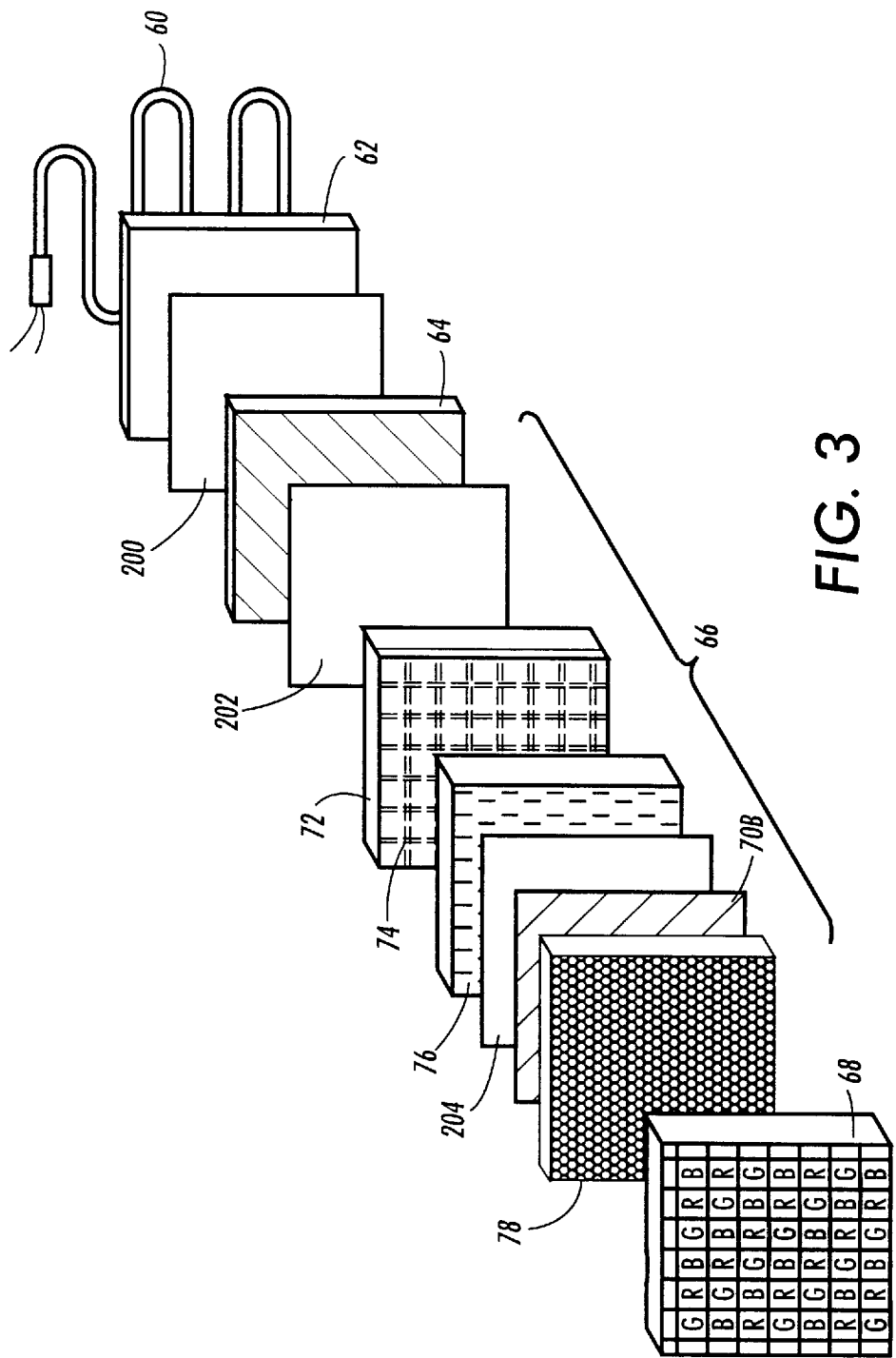
FIG. 3 shows an exploded view of a display which incorporates a liquid crystal cell having a narrow viewing angle along one meridian and which also incorporates optical elements to provide uniformly high contrast in all viewing directions.

To achieve this remarkable viewing angle performance, a light shaping (a BEF and/or holographic diffuser) element 200 is placed after the backlight source 60 and oriented so as to "funnel" most of the light into the high contrast meridian established by the LC cell 66 as shown in FIG. 3. Since the FOFP 78 indiscriminately averages azimuthally, the combination of the properly aligned light shaping element 200 and properly engineered LC cell 66 described above "pre-selects" the light that enters and is averaged by the FOFP 78. This arrangement maximizes the light throughput in the high contrast propagation directions of the cell and minimizes the light throughput in the low contrast propagation directions of the LC cell 66. The FOFP 78 then averages mostly "high contrast" light resulting in higher overall contrast as viewed at the front of the display.

Figure 4:
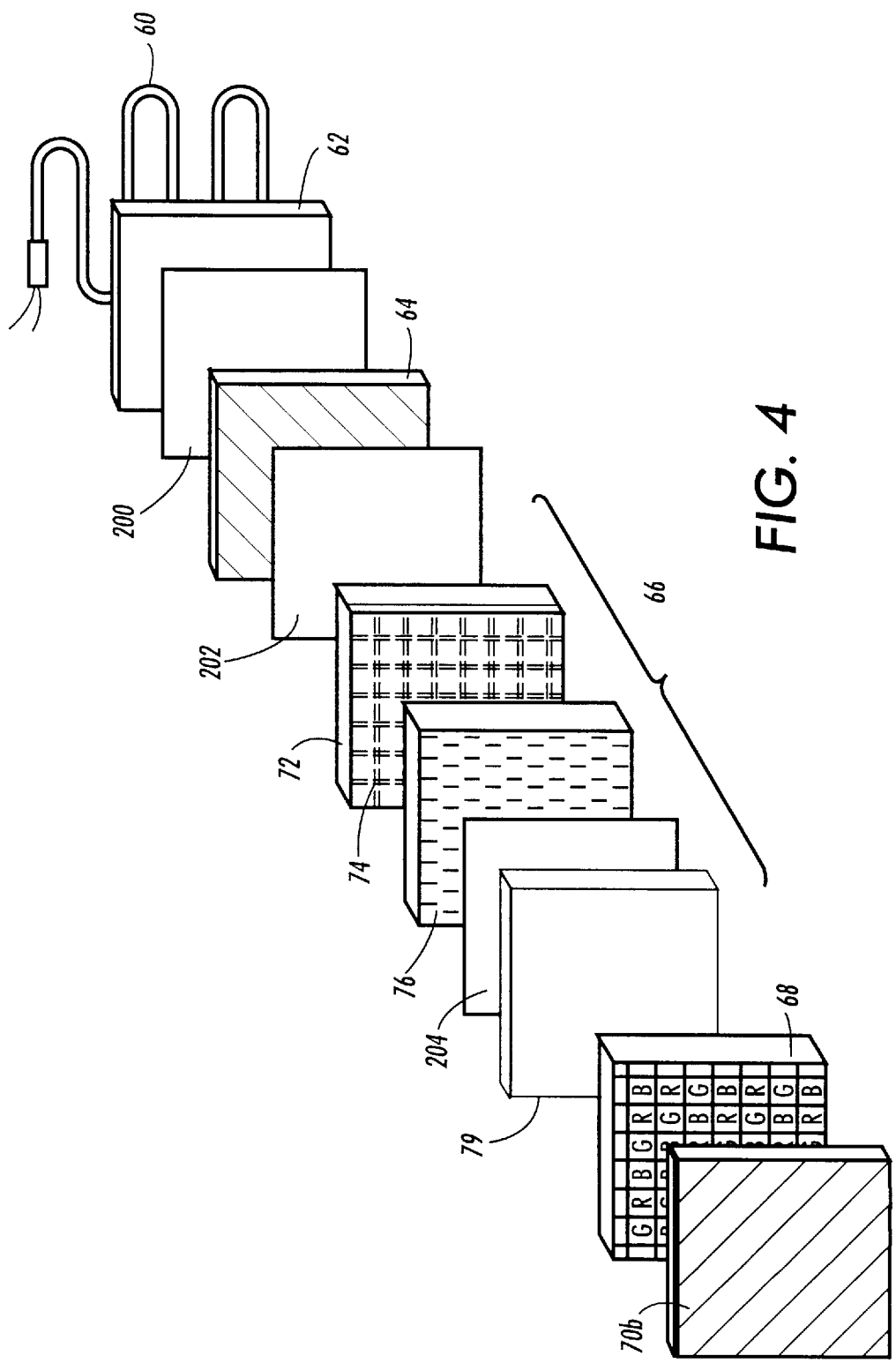
FIG. 4 is a perspective view of a negative retarder showing its indices of refraction.
Figure 5:
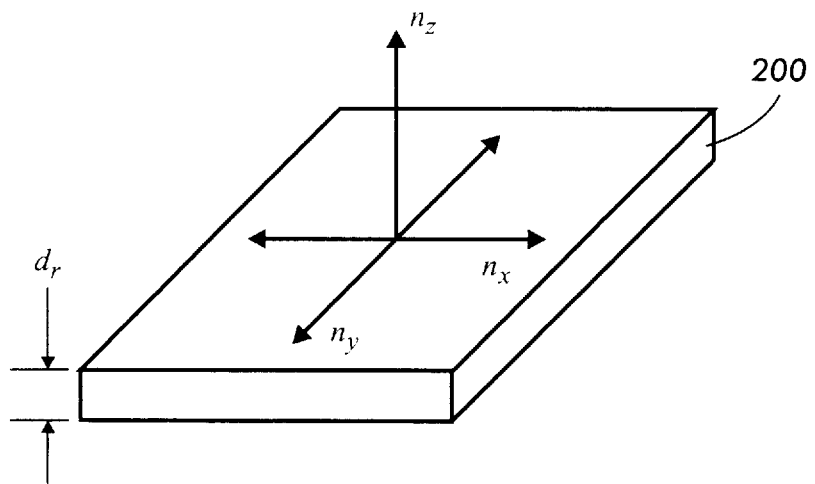
FIG. 5 is a side view of a liquid crystal cell showing the indices of refraction of the LC material.

One method for creating a LC cell 66 having the necessary high contrast predominantly along a single meridian or azimuthal position, as exemplified in FIG. 2, is to produce a TN liquid crystal cell 66 incorporating dual negative retarders 202, 204 as shown in FIG. 3. The dual negative retarders 202, 204 should be located such as to "sandwich" the TN liquid crystal cell 66. That is one retarder 202 should be located between the rear polarizer 64 and the rear glass layer 72 and the other retarder 204 should be located between the front polarizer 70b and the liquid crystal layer 76. Note, that the location of the front polarizer 70b, has been set inside internal to the liquid crystal cell 66, due to the front containing element being an FOFP 78. If the front containing element were not an FOFP the front polarizer could be shifted outside of the liquid crystal cell, for instance, after both the front containing element 79 and the color selection filters 68, as shown in FIG. 4. Each retarder will have indices of refraction nx and ny in the plane of the retarder and an index of refraction nz in the thickness direction of the film as shown in FIG. 5. Also shown in FIG. 5 is a distance $d_r$ which is the thickness of the retarder. The indices of refraction of the retarder should be described by the equation $n_z < n_x = n_y$. The optical path length of the retarder is described by the equation $\Delta nd = (n_z - n_x)d_r$.

Figure 6:
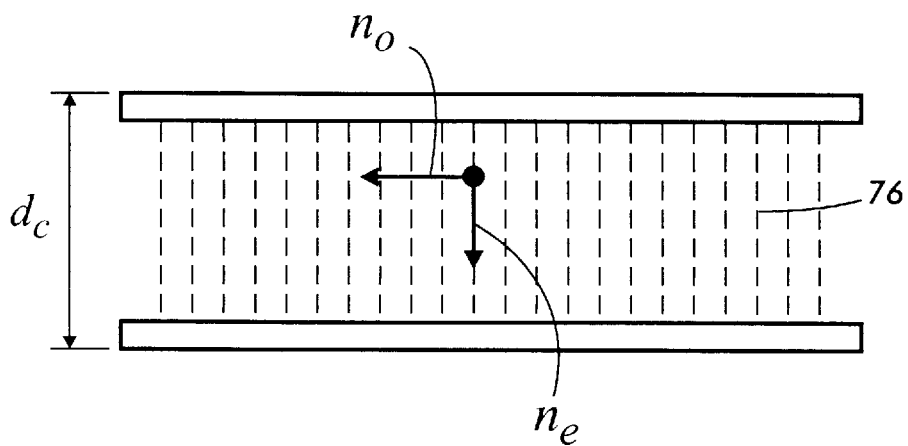
FIG. 6 illustrates light diffraction in a fiber-optic faceplate for on-axis light incidence.

The TN liquid crystal layer 76 has indices of refraction $n_e$ and $n_o$ as shown in FIG. 6. When the LC material is in the homeotropically aligned state, the index of refraction $n_e$ extends in the thickness direction of the TN liquid crystal cell and the index of refraction $n_o$ is perpendicular to the index of refraction $n_e$ and extends in the direction in the plane of the TN liquid crystal cell. The index of refraction $n_e$ is always greater than the index of refraction $n_o$ for a positive optically anisotropic LC material. Also shown in FIG. 5 is a distance $d_c$ which is the thickness of the TN liquid crystal. The optical path length of the TN liquid crystal is described by the equation $\Delta nd = (n_e - n_o)d_c$.

For the retarders 202, 204 to correctly modify the light output of the TN liquid crystal to produce a LC cell having the necessary high contrast predominantly along a single meridian or azimuthal position, as exemplified in FIG. 2, the sum of the optical path lengths of the two retarders 202, 204 must be substantially equal to the optical path length of the TN liquid crystal layer 76 but opposite in sign which is expressed by the equation:

$$(n_{z1}-n_{x1})d_{r1}+(n_{z2}-n_{x2})d_{r2} \approx -(n_e-n_o)d_c.$$

As described above, to improve the LC display contrast dramatically, such a cell must be used in conjunction with a light shaping element 200 such as a BEF and/or holographic diffuser films.

The light shaping element is used to channel most of the intensity of the backlight into the narrow viewing direction of the uniquely tuned liquid crystal cell 66, which is then sent through the FOFP 78 for azimuthal averaging to obtain a greatly increased contrast ratio with a perfectly symmetric viewing angle free from gray scale inversions. The addition of the dual negative retarders 202, 204 to modify the light output of the TN liquid crystal to produce a LC cell having the necessary high contrast predominantly along a single meridian or azimuthal position, as exemplified in FIG. 2, in conjunction with a fiber optic faceplate 78 and a light shaping element 200 provides a significant improvement in the contrast ratio for the display device over using a display device containing some but not all of the elements above.

Diffraction is the deviation from rectilinear propagation that occurs when light waves advance beyond any obstruction or boundary. The obstruction may be opaque, as in the case of a knife-edge or pinhole, or may be a boundary defined by two transparent materials with different refractive indices. Since light reflects, refracts or diffracts from a straight path when encountering a boundary or obstruction, the intensity distribution of a point of light which undergoes diffraction, when projected on a surface some distance from the boundary, will be characterized by a spread function or diffraction pattern. For light transmitted through an aperture, the degree of diffraction or angular deviation in the path of light is determined by the size and shape of the aperture and the wavelength(s) of light from the source. The diffraction pattern at some remote position from the aperture is additionally a function of the distance from the aperture to the plane of observation. The remote or far-field diffraction pattern is typically referred to as a Fraunhoffer diffraction pattern. In optical systems where the circular apertures of lenses, stops and pupils are typically constraints, the Fraunhoffer diffraction pattern is often referred to as the Airy disk. The Airy disk arising from light passing through a circular aperture is well described by a first-order Bessel function with a central bright region surrounded by a series of faint rings of rapidly diminishing intensity. Approximately 84% of the light intensity from a diffracted point source is contained within the first dark ring of the Airy disk. As such, the Airy disk characterizes the blur circle produced by diffraction-limited optical systems.

Figure 7:
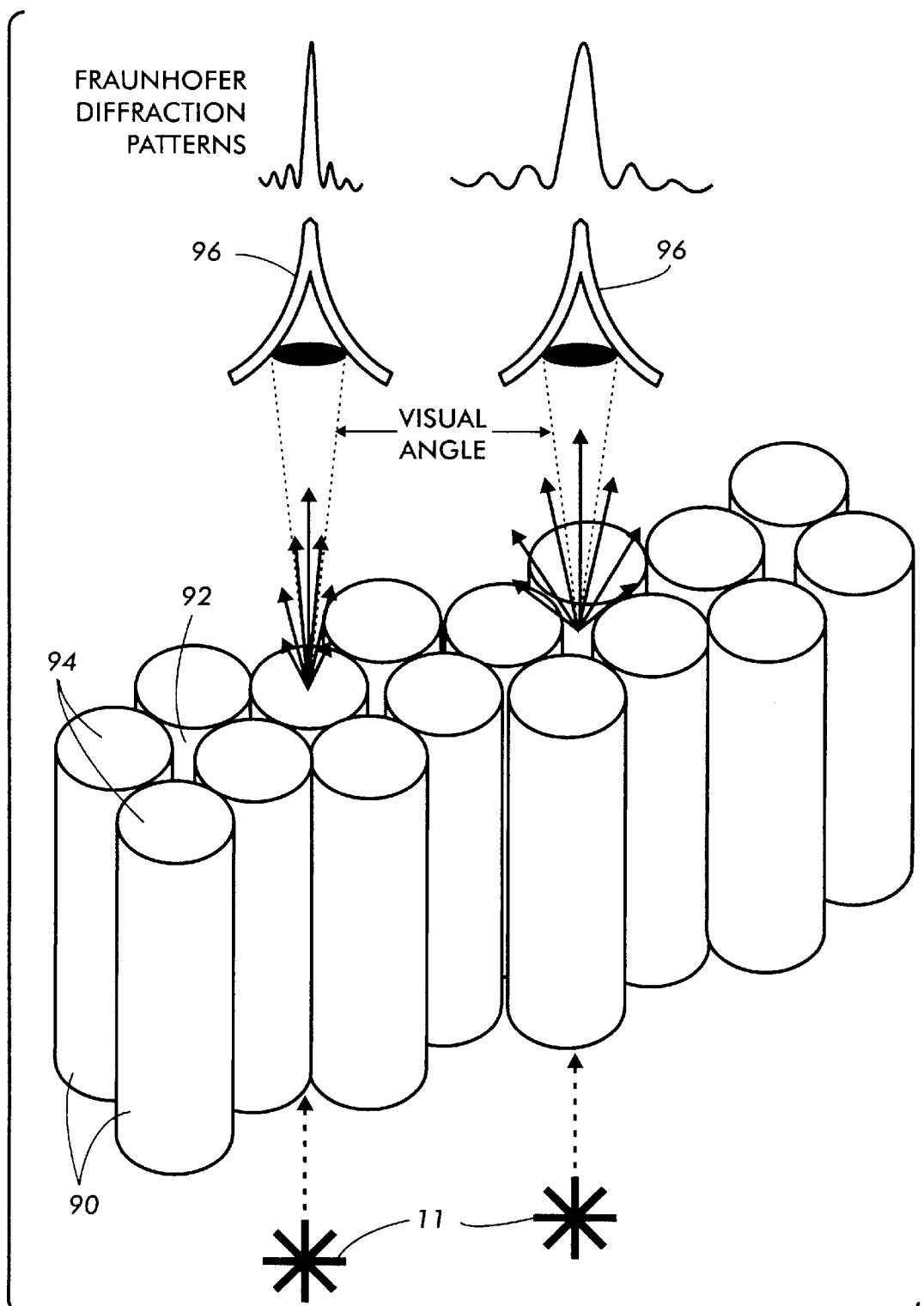
FIG. 7 illustrates light diffraction in a fiber-optic faceplate for off-axis light incidence.

In assessing the impact of diffraction on FOFPs U.S patent application Ser. No. 08/4673,887, by Silverstein et. al. filed on Jun. 7, 1995 and assigned to Xerox Corporation and which is herein incorporated by reference focuses on the angular dispersion of light incident on the FOFP. As shown in FIG. 7, the FOFP consists of a fused plate of optical fibers and interstitial cladding, which constitute two distinct populations of very small apertures. Both the input and output surface of the optical fibers 90 can be considered as small circular apertures 94. The cladding apertures 92 on the two plate surfaces are somewhat irregular in shape and size. However, for purposes of discussion, the cladding apertures 92 will be described as circular apertures with a diameter estimated from the mean diameter of all cladding apertures 92. On-axis illumination 11 entering the FOFP is diffracted into an angular distribution of light paths. The degree of diffraction and hence the width of the angular distribution of light paths is inversely proportional to the diameter of the aperture. Thus, the smaller the aperture the larger the angles into which light propagation through the FOFP is diffracted. The cladding apertures 92, being significantly smaller than the fiber apertures 94, diffract the incoming light into the largest angles. FIG. 7 also shows the relative Fraunhoffer diffraction patterns or Airy disks which would result from the projection of the fiber and cladding diffraction angle distributions on the retina of an observer 96 located some fixed distance from the FOFP. The angular spread resulting from diffraction can be estimated from the following equation:

$$\theta_{diffr}=1.22[(\lambda)(180)]/[(D)(\pi)]$$

where:

$\theta_{diffr}$=half-angle corresponding to first dark ring of the Airy pattern (degrees)

D=diameter of circular aperture $\lambda$=wavelength of light

By reference to the above equation and assuming nominal fiber and cladding diameters of 7 microns and 0.5 microns, respectively, it can be estimated that for incoming light of 550 nm, the diffraction angle corresponding to the first dark ring of the Airy disk is approximately 5.49° for the fiber apertures 94 and 76.9° for the cladding apertures 92. For on-axis illumination and on-axis viewing of a LCD with coupled FOFP, the effects of diffraction in the FOFP will be primarily manifested as a small reduction in display luminance. This is in large part a result of the small light acceptance cone of the eye and of most photometric measurement instruments.

FOFP diffraction is responsible for anomalous reductions in on-axis contrast for coupled LCDs. Establishing this causal relationship would enable the development of effective means to reduce these observed reductions in on-axis LCD contrast. To describe this problem, consider the angle-dependent contrast performance of typical twisted-nematic (TN) or super-twisted nematic (STN) LCDs that has been previously described. The contrast ratio of such displays is typically very high when observed on-axis but exhibits a progressive degradation at off-axis viewing and light propagation angles. This observed contrast degradation, while progressive, is not isotropic for the reasons previously described. At some extreme angles, the contrast of the display may actually reverse resulting in a negative image. These off-axis contrast degradations do not affect the high on-axis contrast performance of the display due to the small light acceptance cone of the eye or of most photometric measurement instruments. However, when a FOFP is coupled to such an LCD, the on-axis contrast performance of the FOFP-coupled display is substantially reduced below the levels achieved without the FOFP. Improvement in the on-axis contrast performance of FOFP-coupled LCDs provide an important enhancement.

Figure 8:
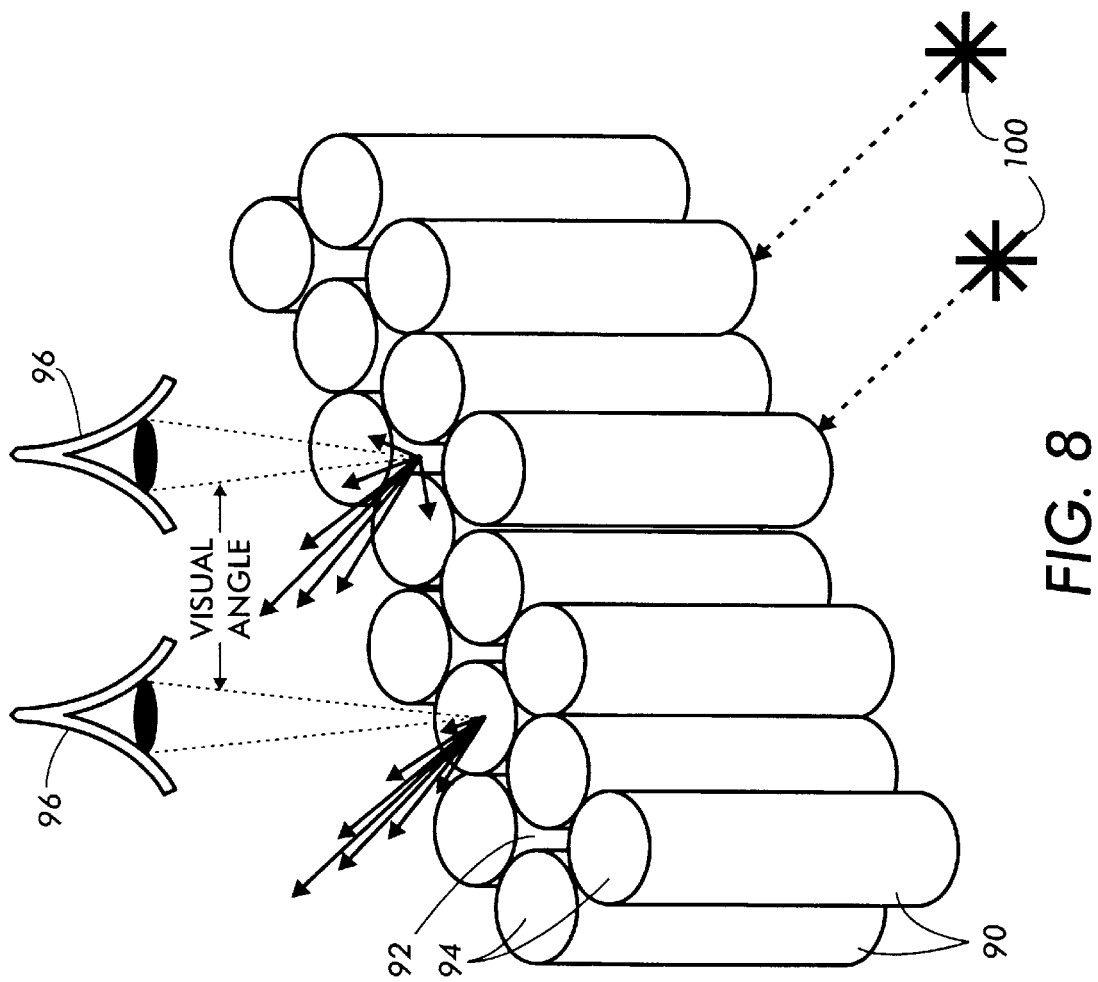
FIG. 8 illustrates the reduction in diffraction-related contrast degradation in a fiber-optic faceplate having opaque cladding apertures.

For light propagating at off-axis, angles to contaminate the on-axis contrast performance of an LCD with FOFP, the angular direction must be changed such that some of this light gets coupled into the small light acceptance cone of the eye or measurement instrument. FIG. 8 shows the incident illumination 100 emerging from the source (i.e., the backlight) at an angle which is off-axis from the normal to the FOFP input surface. At the output surface, the light is diffracted by the fiber apertures 94 and the cladding apertures 92 with an angular distribution about the direction of light propagation. For the larger fiber apertures 94, the relatively small diffraction angles do not diffract much light into the light acceptance cone of the eye 96 or instrument. However, for the much smaller cladding apertures 92, the angular distribution of diffracted off-axis light is quite large and a significant amount of the off-axis light is diffracted into the small light acceptance cone of the eye 96 or measurement instrument. In this manner, the off-axis light from the LCD (and corresponding contrast degradations) are diffracted by the FOFP cladding apertures 92 into the small light acceptance cone of the eye 96 or instrument resulting in significant degradation of on-axis contrast performance of the FOFP-coupled LCD.

Figure 9:
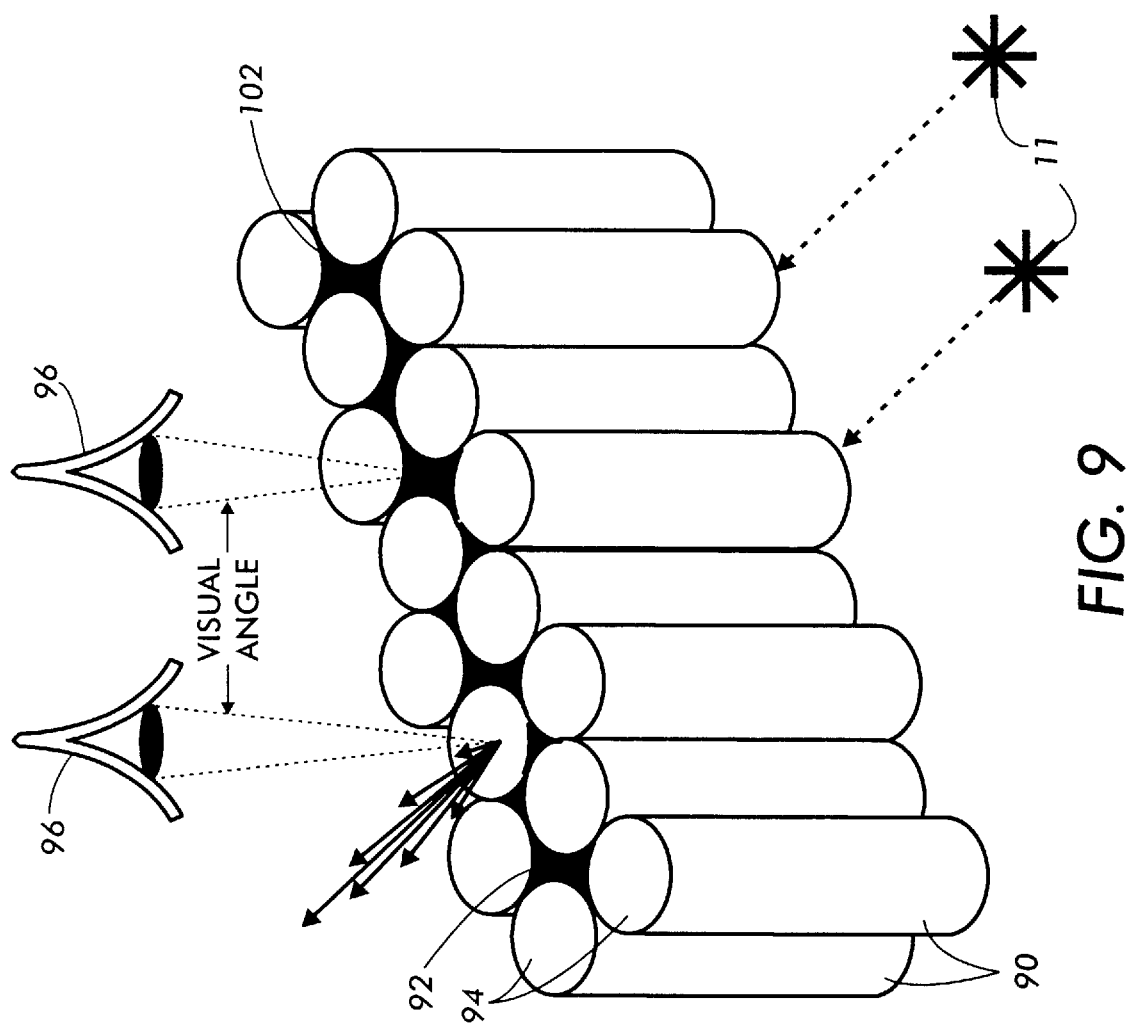
FIG. 9 is a fiber-optic faceplate having transparent cladding apertures.

The on-axis contrast performance of the FOFP-coupled LCD can be dramatically improved by masking the cladding apertures 92 of the FOFP as shown in FIG. 9. This figure illustrates a FOFP with masked cladding 102 and how such masking prevents the cladding apertures 92 from diffracting off-axis light into the observer's viewing cone. Evaluations of LCDs coupled to FOFPs with masked cladding apertures 102 have confirmed the effectiveness of this enhancement, resulting in dramatic improvements in the on-axis contrast performance of FOFP-coupled LCDs. These analyses and the resulting FOFPs with masked cladding apertures 102 provide significant enhancements to the invention disclosed in U.S. Pat. No. 5,442,467 the subject matter of which is incorporated herein by reference.

Figure 10:
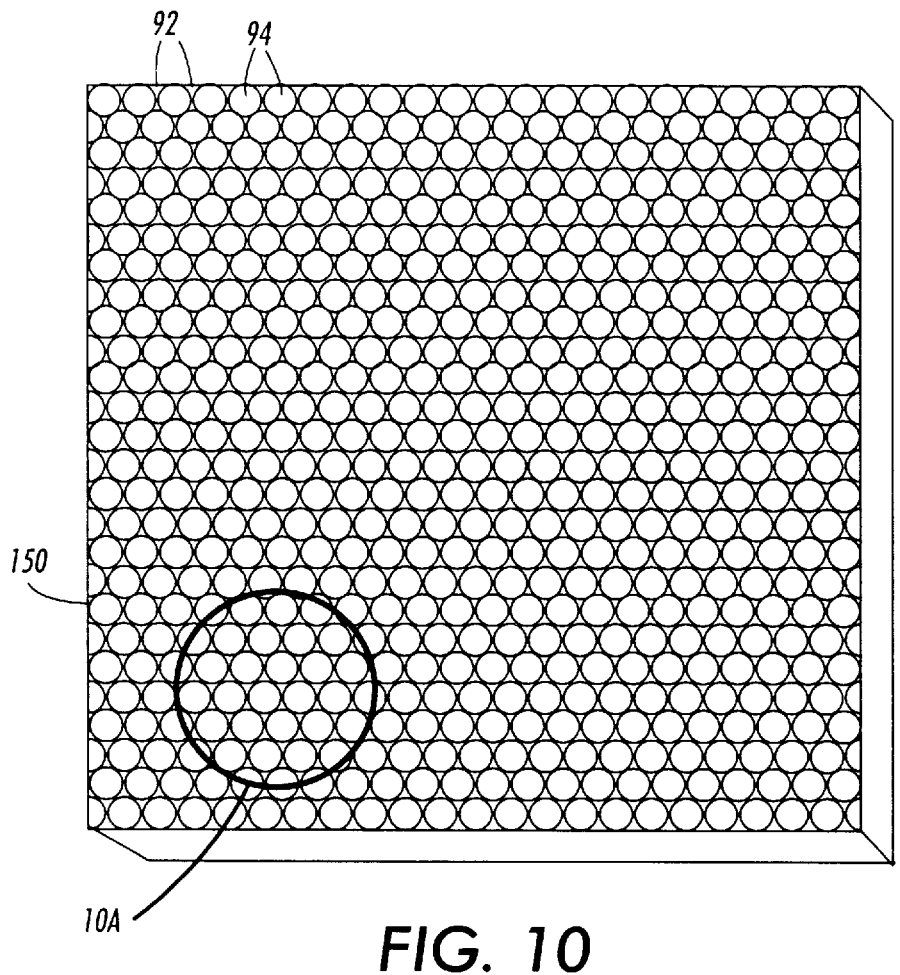
FIG. 10 is a fiber-optic faceplate having opaque cladding apertures.
Figure 10A:
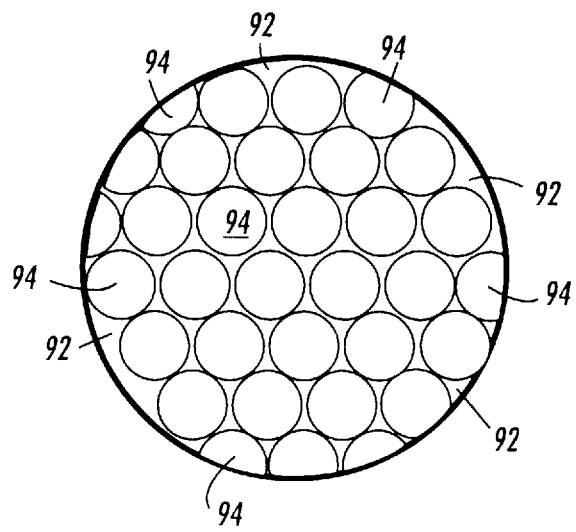
FIG. 10A is an expanded view of a portion of the fiber optic faceplate shown in FIG. 10.
Figure 11:
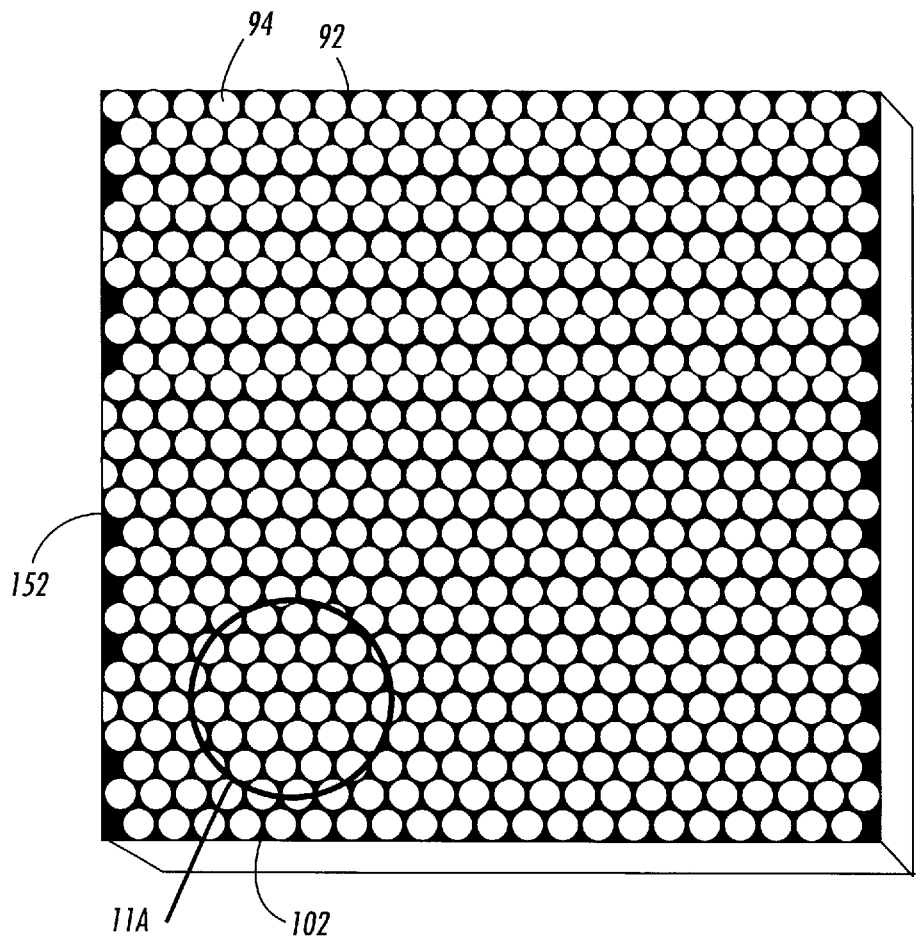
FIG. 11 illustrates the reduction in diffraction-related contrast degradation in a fiber-optic faceplate having opaque cladding.
Figure 11A:
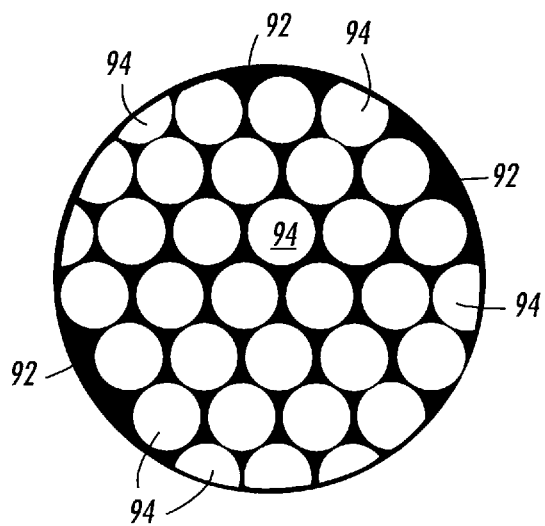
FIG. 11A is an expanded view of a portion of the fiber optic faceplate shown in FIG. 11.
Figure 12:
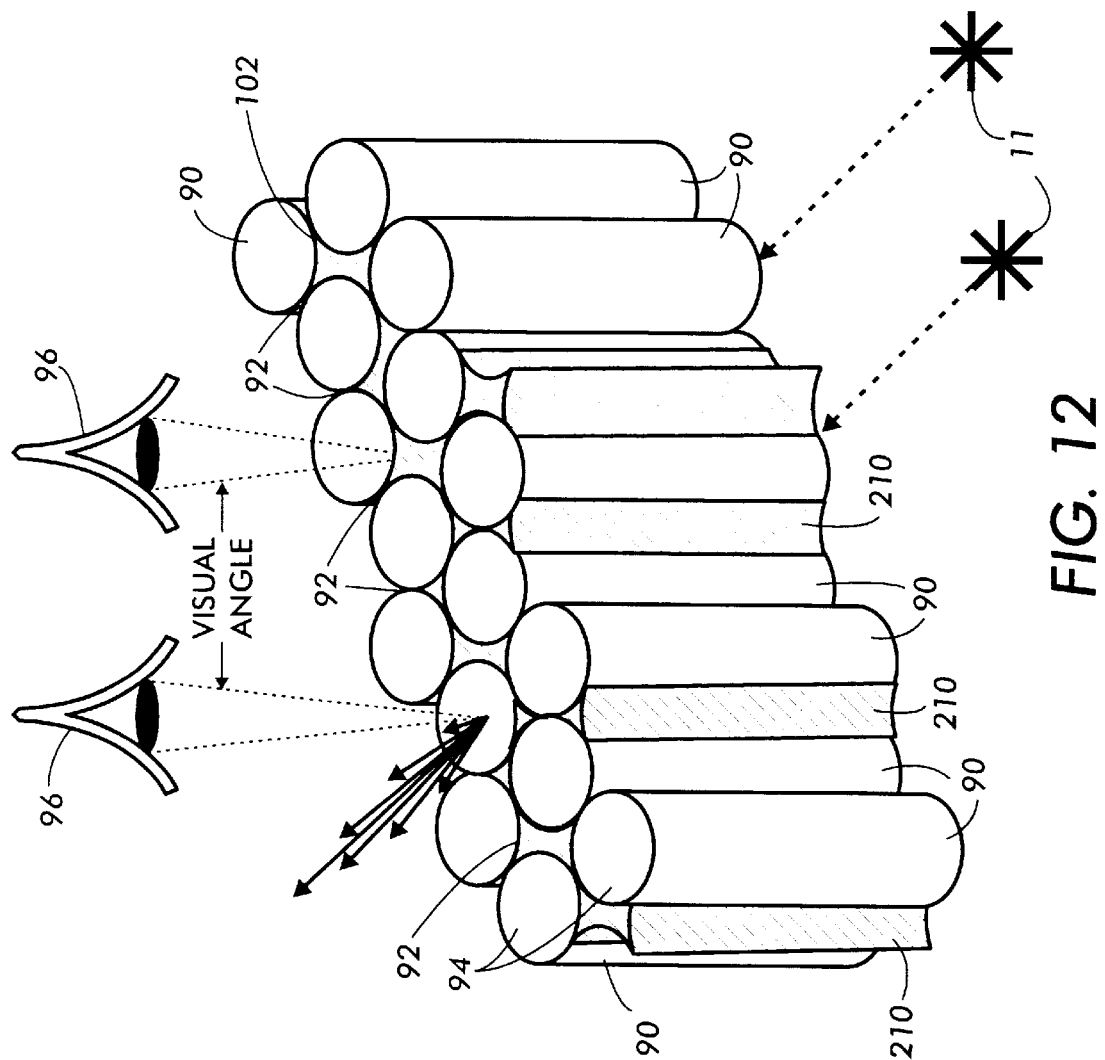
FIG. 12 is a perspective view of a fiber-optic faceplate with opaque cladding apertures.

FIG. 10 is a fused fiber-optic faceplate 150 having transparent cladding apertures 92. FIG. 11 is a fused fiber-optic faceplate 152 with the surface masked with opaque cladding apertures 102. This may be accomplished by coating the front of the FOFP with a blocking layer that covers only the cladding apertures 92 of the FOFP. This coating can be, for example, a metal-metal oxide anti-reflective coating applied over the FOFP and then patterned away over the fiber openings 94 while maintaining the opaque coating over the cladding apertures 92. The anti-reflective nature of the coating reduces ambient reflections from the FOFP. This blocks the diffracted light in the dark-state from high-luminance off-axis directions from coupling into the on-axis direction which greatly improves the on-axis and overall contrast ratio. These coating layers may be obtained from Nanostructures, Inc., located in Santa Clara, Calif. Other coating methods are also within the scope of this invention. For example, the fiber cores 90 and the cladding material may be made from chemically different materials. The FOFP can then be treated with gas to turn the cladding opaque. An alternative method to improve the on-axis contrast performance of the FOFP-coupled LCD is by making the cladding apertures 210 of the FOFP, as shown in FIG. 12, entirely opaque. This figure illustrates a FOFP with opaque cladding 210 and how such opaque cladding prevents the cladding apertures 92 from diffracting off-axis light into the observer's viewing cone. Evaluations of LCDs coupled to FOFPs with opaque cladding 210 have confirmed the effectiveness of this enhancement. Construction of an FOFP with opaque cladding can be accomplished by using an opaque glass to form the cladding during construction of the FOFP as is known in the art.

The invention has been described with reference to the preferred embodiments thereof, which are illustrative and not limiting. Various changes may be made without departing from the spirit and scope of the invention as defined in the appended claims.

We claim:

1. A liquid crystal cell constructed to produce a highly anisotropic light distribution possessing extremely high contrast around a narrow meridian of the display viewing volume comprised of:

A) a liquid crystal subcell comprising:
  i) a rear polarizer,
  ii) a rear glass layer with addressing elements and pixel ITO electrodes,
  iii) a liquid crystal layer,
  iv) a front containing element having a rear surface substantially adjacent to said liquid crystal layer, and
  v) said rear glass layer having a front surface and a rear surface, the rear surface being substantially adjacent to said rear polarizer and the front surface being substantially adjacent to said liquid crystal layer, B) a front polarizer substantially adjacent to the front surface of the front containing element, C) a first negative retardation film interposed between the liquid crystal layer and the front polarizer, D) a second negative retardation film interposed between the rear polarizer and the rear containing element liquid crystal layer, E) said first negative retardation film has indices of refraction $n_{x1}$ and $n_{y1}$ on the plane of the first retardation film and an index of refraction $n_{z1}$ in a thickness direction, a distance $d_{r1}$ which is the thickness of the first retardation film, the indices of refraction of the first retardation film are described by the equation $n_{z1}<n_{x1}=n_{y1}$, and an optical path length of the first retardation film is described by the equation $\Delta nd=(n_{z1}-n_{x1})d_{r1}$, F) said second negative retardation film has indices of refraction $n_{x2}$ and $n_{y2}$ on the plane of the second retardation film and an index of refraction $n_{z2}$ in a thickness direction, a distance $d_{r2}$ which is the thickness of the second retardation film, the indices of refraction of the second retardation film are described by the equation $n_{z2}<n_{x2}=n_{y2}$, and an optical path length of the second retardation film is described by the equation $\Delta nd=(n_{z2}-n_{x2})d_{r2}$, G) said liquid crystal layer, in a homeotropically aligned state, has indices of refraction $n_e$ and $n_o$ where index of refraction $n_e$ extends in a thickness direction of the liquid crystal laver and the index of refraction $n_o$ is perpendicular to the index of refraction $n_e$ and extends in the direction in the plane of the liquid crystal layer, the index of refraction $n_e$ is always greater than the index of refraction $n_o$, for a positive optically anisotropic liquid crystal material, said liquid crystal layer has a distance dc which is the thickness of the liquid crystal layer, and an optical path length of the liquid crystal layer is described by the equation $\Delta nd=(n_e-n_o)d_c$, and H) a sum of the optical path lengths of the two retardation films must be substantially equal to an absolute value of the optical path length of the liquid crystal layer and is opposite in sign to the value of the optical path length of the liquid crystal layer.

2. The liquid crystal cell of claim 1 wherein the optical path lengths of the first and second negative retardation films and the liquid crystal layer are described by the equation $(n_{z1}-n_{x1})d_{r1}+(n_{z2}-n_{x2})d_{r2}=\approx-(n_e-n_o)d_c$.

3. The liquid crystal cell of claim 1, wherein said liquid crystal layer is composed of twisted nematic material.

4. The liquid crystal cell of claim 1, wherein said liquid crystal layer is composed of super-twisted nematic material.

5. An improved liquid crystal cell constructed to produce a highly anisotropic light distribution possessing extremely high contrast around a narrow meridian of the display viewing volume, having a liquid crystal layer disposed between front and rear polarizers, the improvement comprising:

a first negative retardation film interposed between the liquid crystal layer and the front polarizer;

a second negative retardation film interposed between the rear polarizer and the liquid crystal layer;

said first negative retardation film has indices of refraction $n_{x1}$ and $n_{y1}$ on the plane of the first retardation film and an index of refraction $n_{z1}$ in a thickness direction, a distance $d_{r1}$ which is the thickness of the first retardation film, the indices of refraction of the first retardation film are described by the equation $n_{z1}<n_{x1}=n_{y1}$, and an optical path length of the first retardation film is described by the equation $\Delta nd=(n_{z1}n_{x1})d_{r1}$;

said second negative retardation film has indices of refraction $n_{x2}$ and $n_{y2}$ on the plane of the second retardation film and an index of refraction $n_{z2}$ in a thickness direction, a distance $d_{r2}$ which is the thickness of the second retardation film, the indices of refraction of the second retardation film are described by the equation $n_{z2}<n_{x2}=n_{y2}$, and an optical path length of the second retardation film is described by the equation $\Delta nd=(n_{z2}-n_{x2})d_{r2}$;

said liquid crystal layer, in a homeotropically aligned state, has indices of refraction $n_e$ and $n_o$ where index of refraction $n_e$ is measured in a thickness direction of the liquid crystal layer and the index of refraction $n_o$ is measured perpendicular to the index of refraction $n_e$ and in the plane of the liquid crystal layer, the index of refraction $n_e$ is always greater than the index of refraction $n_o$, for a positive optically anisotropic liquid crystal material, said liquid crystal layer has a distance $d_c$ which is a thickness of the liquid crystal layer, and an optical path length of the liquid crystal layer is described by the equation $\Delta nd=(n_e-n_o)d_c$; and a sum of the optical path lengths of the two retardation films being both substantially equal to the absolute value of the optical path length of the liquid crystal layer and opposite in sign to the value of the optical path length of the liquid crystal layer.

* * * * *